(12) United States Patent
Gassho et al.

(10) Patent No.: US 7,233,417 B2
(45) Date of Patent: Jun. 19, 2007

(54) PRINT JOB MANAGEMENT APPARATUS

(75) Inventors: Kazuhito Gassho, Nagano-ken (JP); Noriyuki Nagai, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 932 days.

(21) Appl. No.: 09/988,038

(22) Filed: Nov. 16, 2001

(65) Prior Publication Data

US 2002/0060807 A1    May 23, 2002

(30) Foreign Application Priority Data

Nov. 21, 2000    (JP) .............................. 2000-354348

(51) Int. Cl.
*H04N 1/21* (2006.01)
*G06F 3/12* (2006.01)
*G06F 15/82* (2006.01)

(52) U.S. Cl. ..................... 358/403; 358/1.15; 358/1.13

(58) Field of Classification Search ..................... None
See application file for complete search history.

(56) References Cited

U.S. PATENT DOCUMENTS

| | | | |
|---|---|---|---|
| 5,164,842 A * | 11/1992 | Gauronski et al. | 358/401 |
| 5,327,526 A * | 7/1994 | Nomura et al. | 358/1.16 |
| 5,517,316 A * | 5/1996 | Hube | 358/296 |
| 5,946,106 A * | 8/1999 | Itoh et al. | 358/442 |
| 6,160,629 A * | 12/2000 | Tang et al. | 358/1.1 |
| 6,213,652 B1 * | 4/2001 | Suzuki et al. | 358/1.15 |
| 2002/0030851 A1 * | 3/2002 | Wanda | 358/1.15 |
| 2006/0044595 A1 * | 3/2006 | Ferlitsch | 358/1.15 |

FOREIGN PATENT DOCUMENTS

| | | |
|---|---|---|
| JP | 08-286895 | 11/1996 |
| JP | 08-287027 | 11/1996 |
| JP | 09-305331 | 11/1997 |

(Continued)

OTHER PUBLICATIONS

International Standard ISO/IEC10175-1: 1996(E), Document Printing Application (DPA)—Part 1: Abstract service definition and procedures, 1st Ed., pp. 66-68, 116.*

(Continued)

*Primary Examiner*—Twyler Lamb
*Assistant Examiner*—Myles D. Robinson
(74) *Attorney, Agent, or Firm*—Martine Penilla & Gencarella, LLP

(57) ABSTRACT

The technique of the present invention increases a variation in status used for management of print jobs, thereby enhancing utility of a printer. In a printing system constructed via a network LAN, a printer PRT includes a job management apparatus that manages statuses of print jobs in conformity with International Standard ISO/IEC10175-1. The job management apparatus has a create control module 6 in addition to diverse functional blocks for processing the print jobs based on the International Standard. When the user gives an instruction 'create' to a print job in a 'held' status, the create control module 6 creates a new daughter job from the print job in the 'held' status as a mother job and executes printing of either the mother job or the daughter job, while keeping at least one print job in the 'held' status. This arrangement enables a registered document to be reprinted iteratively at any arbitrary time.

4 Claims, 6 Drawing Sheets

FOREIGN PATENT DOCUMENTS

| | | |
|---|---|---|
| JP | 11-353138 | 12/1999 |
| JP | 2000-141789 | 5/2000 |
| JP | 2000-207150 | 7/2000 |
| JP | 2000-211213 | 8/2000 |

OTHER PUBLICATIONS

Abstract of Japanese Patent Publication 08-286895, Pub. Date: Nov. 1, 1996, Patent Abstracts of Japan.

Abstract of Japanese Patent Publication 08-287027, Pub. Date: Nov. 1, 1996, Patent Abstracts of Japan.

Abstract of Japanese Patent Publication 09-305331, Pub. Date: Nov. 28, 1997, Patent Abstracts of Japan.

Abstract of Japanese Patent Publication 11-353138, Pub. Date: Dec. 24, 1999, Patent Abstracts of Japan.

Abstract of Japanese Patent Publication 2000-141789, Pub. Date: May 23, 2000, Patent Abstracts of Japan.

Abstract of Japanese Patent Publication 2000-207150, Pub. Date: Jul. 28, 2000, Patent Abstracts of Japan.

Abstract of Japanese Patent Publication 2000-211213, Pub. Date: Aug. 2, 2000, Patent Abstracts of Japan.

\* cited by examiner

Fig. 3

STATUS MANAGEMENT TABLE

| ID | Statuses | Instructions | Attribute Information |
|---|---|---|---|
| 1 | pending | | |
| 2 | held | release | |
| 3 | printing | | |
| 4 | pending | | |
| 5 | retained | | |
| 6 | held | create | |
| 7 | interPreting | hold | |
| | | | |

PRINT JOB MANAGEMENT APPARATUS

BACKGROUND OF THE INVENTION

1. Field of the Invention

The present invention relates to a print job management system that receives a plurality of print jobs from, for example, computers, and manages the plurality of print jobs to be adequately printed with printers.

2. Description of the Related Art

With spread of LANs (Local Area Networks), the system, in which a plurality of computers connecting with a network (hereinafter referred to as 'clients') share one or multiple printers also connecting with the network, becomes popular. Multiple print jobs are transmitted from the clients to each printer. Each printer is provided with an internal or external spool buffer for storing the transmitted print jobs. The print jobs are temporarily registered in the spool buffer and successively transferred to the printer to be printed.

The print job is printed through diverse statuses. The spool buffer manages print jobs based on these statuses. The statuses are defined by International Standard ISO/IEC10175-1. FIG. 1 shows the outline of the statuses defined by International Standard ISO/IEC10175-1. Only the main statuses are illustrated here.

The status 'receiving' means that the buffer is now receiving a print job transmitted from the client. The status of the print job that has been received by the buffer is shifted to 'pending' (see the arrow tr1). The status 'pending' means that the received print job is added to a waiting queue of printing operation. The print jobs added to the waiting queue are successively executed according to a predetermined order of priority.

The status of the print job, which should be processed currently, is shifted from 'pending' to 'interPreting' (see the arrow tr2). The print jobs are described in diverse protocols and languages, for example LPR and PostScript. It is accordingly required to interpret the contents of data in each print job and convert the data of the print job into data intrinsic to the printer used for printing. The status 'interPreting' means that such data conversion is being carried out.

After completion of the interpreting, the status of the print job is shifted to 'printWaiting' (see the arrow tr3). The status 'printWaiting' means that the print job is waiting until the printer gets ready for printing.

When the printer is read for printing, the print job is transferred to the printer and is printed. This further shifts the status of the print job to 'printing' (see the arrow tr4). On completion of the printing operation, the status is changed to 'completed' (see the arrow tr5). In general, the print job is eliminated and the job management is concluded at this moment.

An instruction to retain for a preset time period after conclusion of printing may be attached to the print job. In such cases, the status of the print job is further shifted from 'completed' to 'retained' (see the arrow tr7). The status 'retained' means that the print job is not eliminated but is kept until either of conditions, that is, input of a user's reprinting instruction and elapse of a predetermined time period, is fulfilled. In response to input of a user's reprinting instruction via the client or an interface of the printer, the status of the print job is shifted from 'retained' to 'pending' (see the arrow tr9). The process of job management newly creates a print job identical with the print job in the 'retained' status and keeps the newly created print job in the 'pending' status. Namely the job management assigns different pieces of identification information, for example, job number or indexes to the existing print job in the 'retained' status and the newly created print job in the 'pending' status.

There is often an additional function of holding execution of the print job, in addition to the series of processing flow discussed above. This function results in a 'held' status. The shift to the 'held' status is implemented in response to input of a user's instruction via the client or the interface of the printer. The shift to the 'held' status is allowed from any of the 'pending', 'printWaiting', 'interPreting', 'printing', and 'completed' statuses (see the arrows tr6). The shift to the 'held' status is otherwise implemented by attaching data, which represents an instruction of a shift to the 'held' status, to the print job. The print job in the 'held' status is kept in the current state until input of a user's instruction. In response to a user's release instruction, the status of the print job is again shifted to 'pending' (see the arrow tr8). The print job in the 'held' status may alternatively be eliminated in response to a user's discarding instruction.

The statuses 'held' and 'retained' are similar to each other in some sense, since the job is kept in either of these statuses. There is, however, a distinct difference between these two statuses. The shift to the 'retained' status is allowed only after execution of the print job, while there is no such a restriction with regard to the shift to the 'held' status. Execution of a print job in the 'retained' status accompanies creation of a new print job, whereas execution of a print job in the 'held' status does not accompany creation of a new print job. Namely the print job itself kept in the 'held' status is executed in the latter case. The print job in the 'retained' status is generally eliminated after elapse of a predetermined time period. The print job in the 'held' status is, however, kept without any time limit.

The job management apparatus functions to manage the statuses of the respective print jobs and control execution of the respective print jobs. The job management apparatus is conventionally constructed by a software program called a spooler inside the printer or a print server separate from the printer.

The prior art job management carried out in the range defined by the International Standard, however, sometimes has poor utility in practical printing services. For example, it is required to output a new job from the client every time a frequently used document is to be printed. The client should be activated on every occasion of reprinting. This results in poor utility in practice.

SUMMARY OF THE INVENTION

At least part of the problems discussed above is solved in the job management apparatus that manages statuses of print jobs in conformity with International Standard ISO/IEC10175-1. The technique of the present invention registers frequently required print jobs in the job management apparatus and utilizes such print jobs under a specific condition that keeps the print jobs in a 'held' status.

In a first application of the present invention that allows utilization of the print jobs, the procedure creates at least one daughter job from a specified print job in a 'held' status as a mother job in response to a printing instruction given to the specified print job in the 'held' status. The procedure keeps at least one of the mother job and the daughter jobs in the 'held' status and executes at least one of the other print jobs.

The process may execute at least one of the daughter jobs while keeping the mother job in the 'held' status. The process may alternatively execute the mother job while keeping at least one of the daughter jobs in the 'held' status.

The arrangement of keeping frequently used documents in the 'held' status enables these documents to be printed without individual output of the corresponding print jobs. Storage of the documents not in the 'retained' status but in the 'held' status does not require execution of the printing operation and thus desirably prevents non-required printing for accumulation of the print jobs. This arrangement enables the print jobs to be readily accumulated for a long time period without any limit of the storage term.

Creation of the daughter print job in the process of executing the printing operation has the following advantages. The print job in the 'held' status is executed in response to an instruction to release the 'held' status and is then eliminated. Simple storage of frequently used documents in the 'held' status does not allow the documents to be used in an iterative manner. One possible procedure to allow repeated use of the documents gives an instruction to return the status to 'held' after completion of the printing operation in response to a printing instruction. This procedure is, however, rather complicated and damages the utility in printing. It is highly possible that a desired print job is eliminated by an erroneous instruction. This does not ensure stable reprinting of the documents in the 'held' status. The technique of the present invention automatically creates a new daughter print job in the course of executing the print job in the 'held' status. This arrangement executes the print job while keeping the print job in the 'held' status without such problems.

It is not necessary to create daughter jobs from all the print jobs in the 'held' status. The print job may be released from the 'held' status without creation of any daughter jobs according to the type of the print job and input of the printing instruction.

In a second application of the present invention, the procedure executes a specified print job in a 'held' status in response to a printing instruction given to the specified print job in the 'held' status. On completion of the print job, the procedure creates at least one daughter job from the executed print job as a other job and shifts the status of the at least one daughter job to 'held'. Whereas the first application creates daughter jobs prior to execution of the printing operation, the second application creates daughter jobs after execution of the printing operation. The second application exerts the similar effects to those of the first application discussed above.

The first application and the second application discussed above regard the job management apparatus that manages the statuses of print jobs in conformity with International Standard ISO/IEC10175-1. The present invention is, however, not restricted to such a job management apparatus but is applicable to a job management apparatus that executes unique job management.

In the latter case, the job management apparatus has the function of excluding an input print job from a waiting queue of printing operation and keeping the input print job in the held status One procedure creates at least one daughter job in response to a printing instruction given to the print job in the held status and adds print jobs but at least one of the daughter jobs and the mother job to the waiting queue. This arrangement actualizes the structure equivalent to the structure of the first application of the present invention. Another procedure creates at least one daughter job on completion of the print job in the held status and shifts the status of the at least one daughter job to held. This arrangement actualizes the structure equivalent to the structure of the second application of the present invention.

The present invention may be actualized by diverse applications other than the job management apparatus discussed above, for example, a print job management method, a recording medium in which a program for managing print jobs is recorded, and the program. Typical examples of the recording medium include flexible disks, CD-ROMs, magneto-optic discs, IC cards, ROM cartridges, punched cards, prints with barcodes or other codes printed thereon, internal storage devices (memories like a RAM and a ROM) and external storage devices of the computer, and a variety of other computer readable media.

These and other objects, features, aspects, and advantages of the present invention will become more apparent from the following detailed description of the preferred embodiments with the accompanying drawings.

BRIEF DESCRIPTION OF THE DRAWINGS

FIG. 3 shows the outline of a status management table;

DESCRIPTION OF THE PREFERRED EMBODIMENTS

Figure 2:
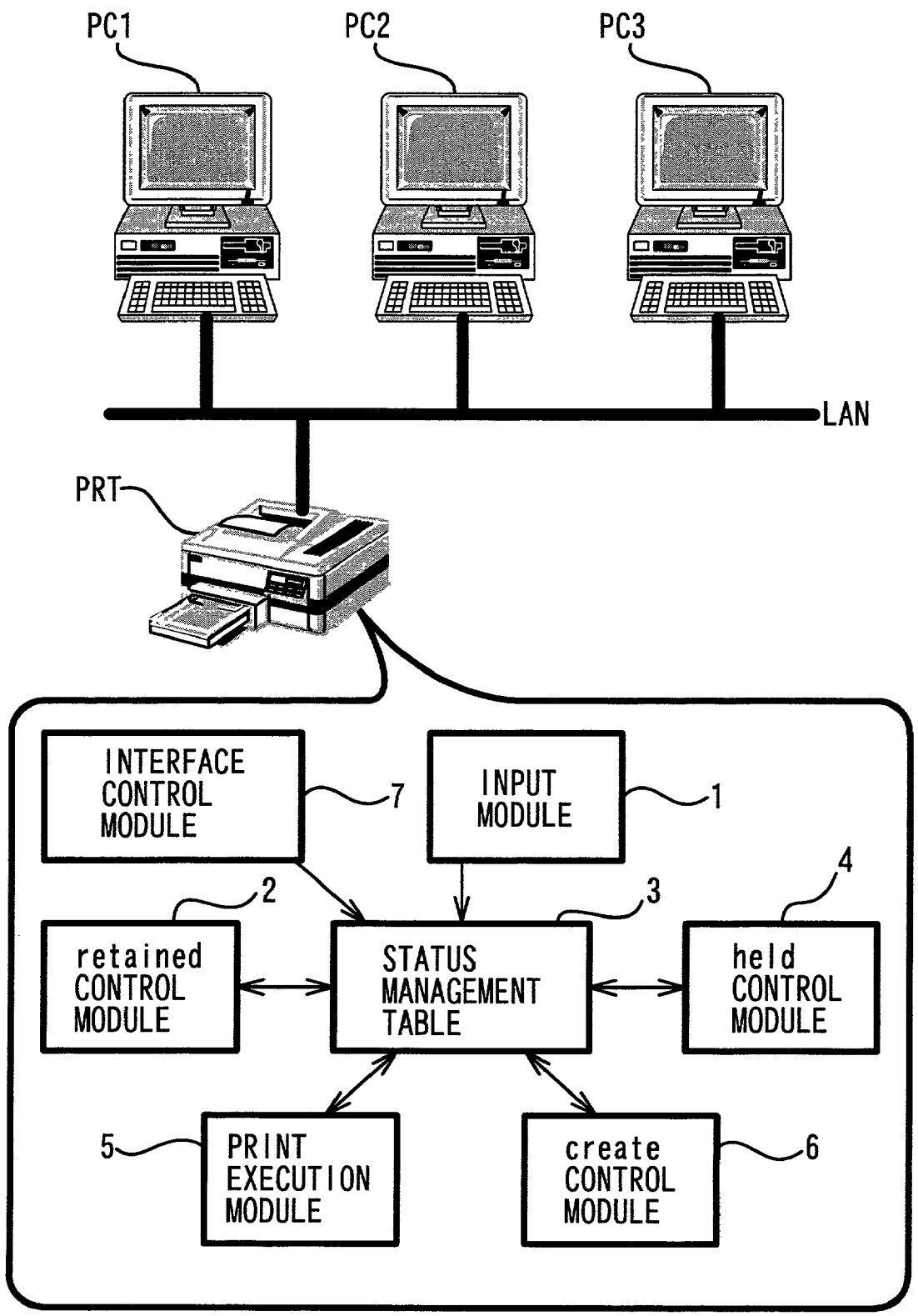
FIG. 2 illustrates the structure of a printing system with a job management apparatus in one embodiment of the present invention.

Some modes of carrying out the present invention are discussed below as preferred embodiments in the following sequence:
A. System Construction
B. Printing Process Starting in 'held' status
C. Modified Example
D. Second Embodiment A. System Construction FIG. 2 illustrates the structure of a printing system with a job management apparatus in one embodiment of the present invention. Client computers PC1 to PC3 and a printer PRT are mutually connected via a LAN (Local Area Network). The numbers of the client computers and the printers are not restricted to this embodiment.

Each of the client computers PC1 to PC3 is a general-purpose computer and creates documents and images according to various applications. Multiple print jobs including data of the documents and images thus created are output from the client computers PC1 to PC3 to the printer PRT. The respective print jobs are converted into packets according to a predetermined communication protocol and transmitted to the printer PRT via the LAN. The printer PRT includes a spool buffer, in which the transmitted print jobs are temporarily registered. The printer PRT manages the statuses of the multiple print jobs transmitted from the client computers PC1 to PC3 and successively carries out the printing operations.

In the structure of this embodiment, the job management apparatus for managing statuses of print jobs is incorporated in the printer PRT. The printer PRT has a microcomputer including a CPU, a ROM, and a RAM as a control unit for controlling the printing operations. The job management apparatus is attained by the software configuration utilizing this control unit. Functional blocks constituting the job management apparatus are illustrated in FIG. 2. The job management apparatus of the embodiment manages the statuses of the print jobs in conformity with International Standard ISO/IEC10175-1 (hereinafter simply referred to as the 'International Standard').

The statuses of the print jobs are managed by a status management table 3. The respective functional blocks included in the job management apparatus gain access to the status management table 3, perform the functions assigned thereto, and cooperate with one another via the status management table 3.

FIG. 3 schematically illustrates the status management table 3. The job management apparatus assigns identification indexes ID to the respective print jobs for the purpose of management. The indexes ID are also mapped to storage positions (pointers) of the respective print jobs in the spool buffer.

The status, the instruction, and the attribute information of each print job corresponding to each index ID are stored in the status management table 3. The status represents one of the respective statuses in conformity with the International Standard illustrated in FIG. 1. The instruction may be input from any of the client computers PC1 to PC3 via the LAN or input via an interface of the printer PRT to make each print job subjected to required processing. The attribute information includes settings of the printing operations, for example, the number of copies to be printed and paper settings.

Referring back to FIG. 2, the other functional blocks of the job management apparatus are discussed. An input module 1 functions to input instructions transmitted from the client computers PC1 to PC3 via the network. An interface control module 7 functions to control the input from the interface incorporated in the main body of the printer PRT. These inputs are reflected on the 'instruction' information in the status management table 3. In the example of FIG. 3, instructions 'release', 'create', and 'hold' are input respectively to jobs 2, 6, and 7. The meanings of these instructions will be discussed later with the other functional blocks.

A held control module 4 processes print jobs in the 'held' status defined by the International Standard. The held control module 4 first detects print jobs in the 'held' status based on the status information stored in the status management table 3. Each of the detected print jobs undergoes some processing corresponding to the instruction information within a range in conformity with the International Standard. One of the typical processes executed by the held control module 4 is 'release'. The instruction 'release' is a print job shifting instruction based on the International Standard. The print job in the 'held' status is simply shifted to the 'pending' status, in response to the 'release' instruction.

A create control module 6 also processes print jobs in the 'held' status. Whereas the held control module 4 carries out the processing in the range in conformity with the International Standard, the create control module 6 carries out processing intrinsic to the job management apparatus of the embodiment. One of the typical processes executed by the create control module 6 is 'create'. The instruction 'create' creates a daughter job from the print job in the 'held' status as a mother job and executes printing of the mother job while keeping the daughter job in the 'held' status.

The respective functions of the held control module 4 and the create control module 6 are discussed in detail with the example of FIG. 3. In this example, the jobs 2 and 6 are in the 'held' status. The instruction 'release' is given to the job 2, and the instruction 'create' is given to the job 6.

The held control module 4 executes a 'release' process with regard to the job 2. The 'release' process updates the status information of the job 2 to 'pending'. The create control module 6 executes a 'create' process with regard to the job 6. The create control module 6 first copies the job 6 to create a new daughter job. Accompanied with the creation, the create control module 6 adds information regarding the daughter job with a new index ID, which is different from the index ID of the job 6, to the status management table 3. At this moment, the daughter job is in the 'held' status. The create control module 6 then shifts the status of the mother job or the job 6 to 'pending'. The shift is implemented by updating the status information of the job 6.

Referring back again to FIG. 2, a print execution module 5 is discussed. The print execution module 5 processes each print job in one of the statuses 'pending', 'interPreting', 'printWaiting', 'printing', and 'completed' in conformity with the International Standard, based on the status information in the status management table 3.

The process determines whether or not the order of printing has reached a print job in the 'pending' status based on a waiting queue, and updates the status of the print job to 'interpreting' at the time when the order of printing has reached the print job. The process makes a print job in the 'interPreting' status undergo interpretation discussed previously and updates the status of the print job to 'printWaiting' at the time of conclusion of the interpretation. With regard to a print job in the 'printing' status, the process updates the status to 'completed' at the time of conclusion of printing. With regard to a print job in the 'completed' status, the process eliminates the print job or shifts the status to 'retained', based on the attribute information attached to the print job.

When an instruction 'hold' for shifting the status to 'held' is given to the print job in any of the 'pending', 'printWaiting', 'interpreting', 'printing', and 'completed' statuses, the status information is updated to 'held'.

In this embodiment, the print execution module 5 comprehensively carries out the processing according to each status. One possible modification may provide functional blocks for the respective statuses.

A retained control module 2 processes print jobs in the 'retained' status in conformity with the International Standard, based on the status information in the status management table 3. The retained control module 2 monitors a print job in the 'retained' status for the elapse of time since the start of the 'retained' status, and eliminates the print job when the elapse of time exceeds a preset time period. The preset time period is specified by the user. When a reprinting instruction 'reprint' is output prior to the elimination, the retained control module 2 creates a new print job from the print job in the 'retained' status and sets 'pending' to the status of the newly created print job.

B. Printing Process Starting in 'held' status

Figure 4:
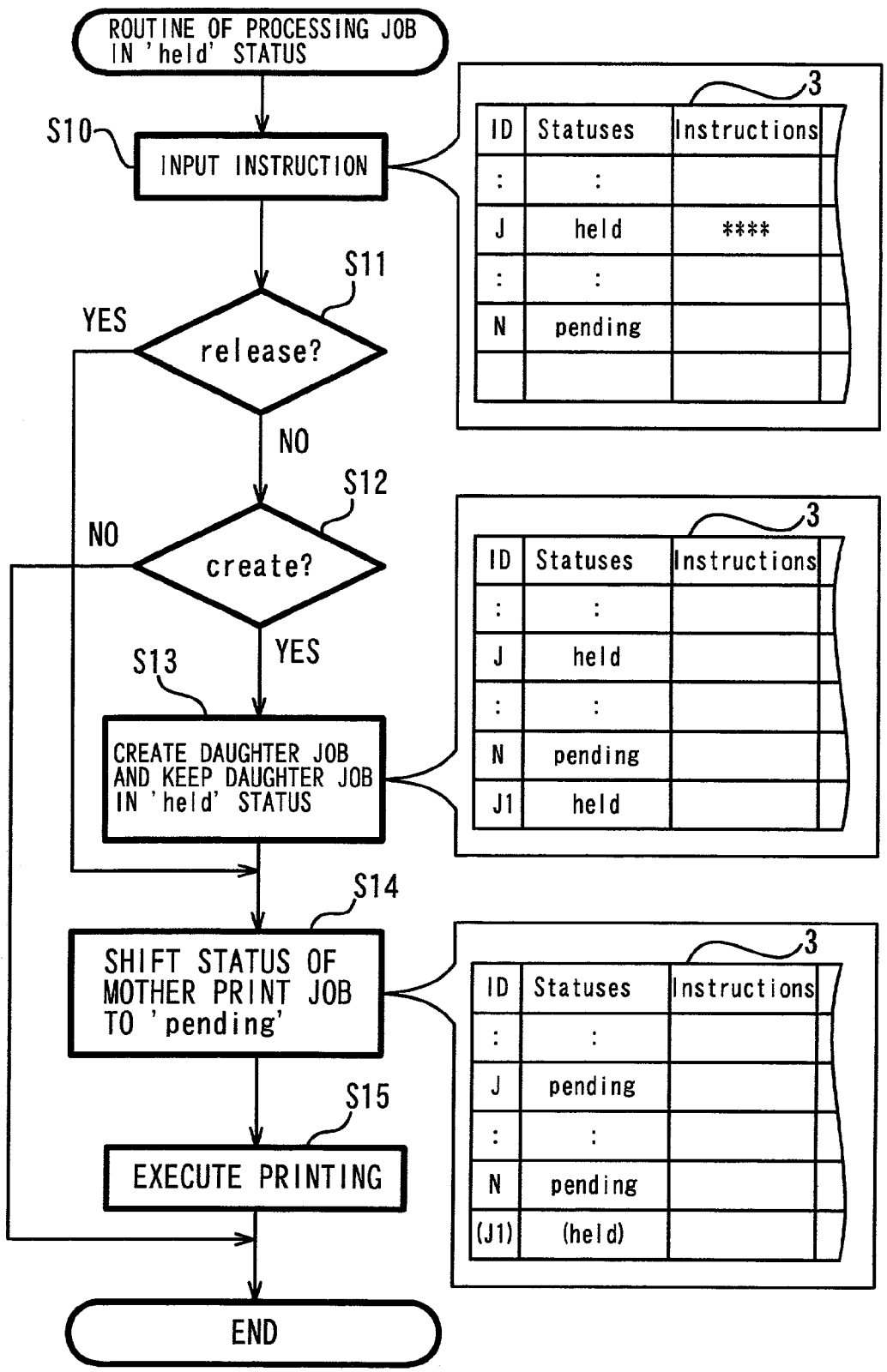
FIG. 4 is a flowchart showing a printing process routine that starts in a 'held' status.

FIG. 4 is a flowchart showing a printing process routine starting in the 'held' state. The series of processing cooperatively executed by the functional blocks shown in FIG. 2 is shown with regard to a specific job.

The program starts the series of processing in response to input of an instruction given to a print job in the 'held' status at step S10. The instruction is input from the interface incorporated in the printer PRT or from any of the client computers PC1 to PC3. In the former case, the instruction is input via an interface control module 7. In the latter case, the instruction is input via the input module 1. Examples of the instruction includes 'release' and 'create' discussed above with FIG. 2. The input instructions are stored as part of the instruction information in the status management table 3.

The contents of the status management table 3 are also illustrated in FIG. 4. In this example, information regarding print jobs up to an index N is stored in the status management table 3, and a print job with an index J is in the 'held' status. In response to input of an instruction to this print job with the index J, the input instruction is added to the instruction information.

The program subsequently determines whether or not the input instruction is 'release' at step S11. The decision is executed by the held control module 4. When the input instruction is 'release', the held control module 4 determines that the print job is an own object to be processed and carries out the 'release' process. Namely the held control module 4 shifts the status of the print job to 'pending' at step S14. The shift of the status is implemented by updating the status information of the print job with the index J to 'pending' in the status management table 3 as illustrated in FIG. 4.

When the input instruction is not 'release', the program then determines whether or no the input instruction is 'create' at step S12. The decision is executed by the create control module 6. When the input instruction is not 'create', this means that no printing instruction is given to the print job in the 'held' status. The program accordingly exits from this processing routine.

When the input instruction is 'create', the create control module 6 carries out the 'create' process. The create control module 6 first creates a new daughter job and sets 'held' to the status of the newly created daughter job at step S13. In the illustrated example, a daughter job with an index J1 is newly created from the print job with the index J as the mother job. The daughter job with the index J1 is kept in the 'held' status. The create control module 6 then shifts the status of the mother print job with the index J to 'pending' at step S14.

After the status of the print job with the index J has been shifted to 'pending' by either the held control module 4 or the create control module 6, the print execution module 5 carries out the actual printing operation of the print job with the index J at step S15.

The job management apparatus of the embodiment discussed above effectively uses the 'create' process to enhance the utility of the printer PRT. For example, any frequently used document may be registered in the 'held' status in the spool buffer and reprinted iteratively according to the requirements. The printing instruction may be input via the interface incorporated in the printer PRT, so that reprinting is allowed even in the inactive state of the client computers PC1 to PC3. When the print job in the 'held' status is reprinted by the 'create' process, the newly created daughter job is kept in the 'held' status in the spool buffer. This arrangement readily and securely attains frequent repeated printing of the specific print job.

Figure 1:
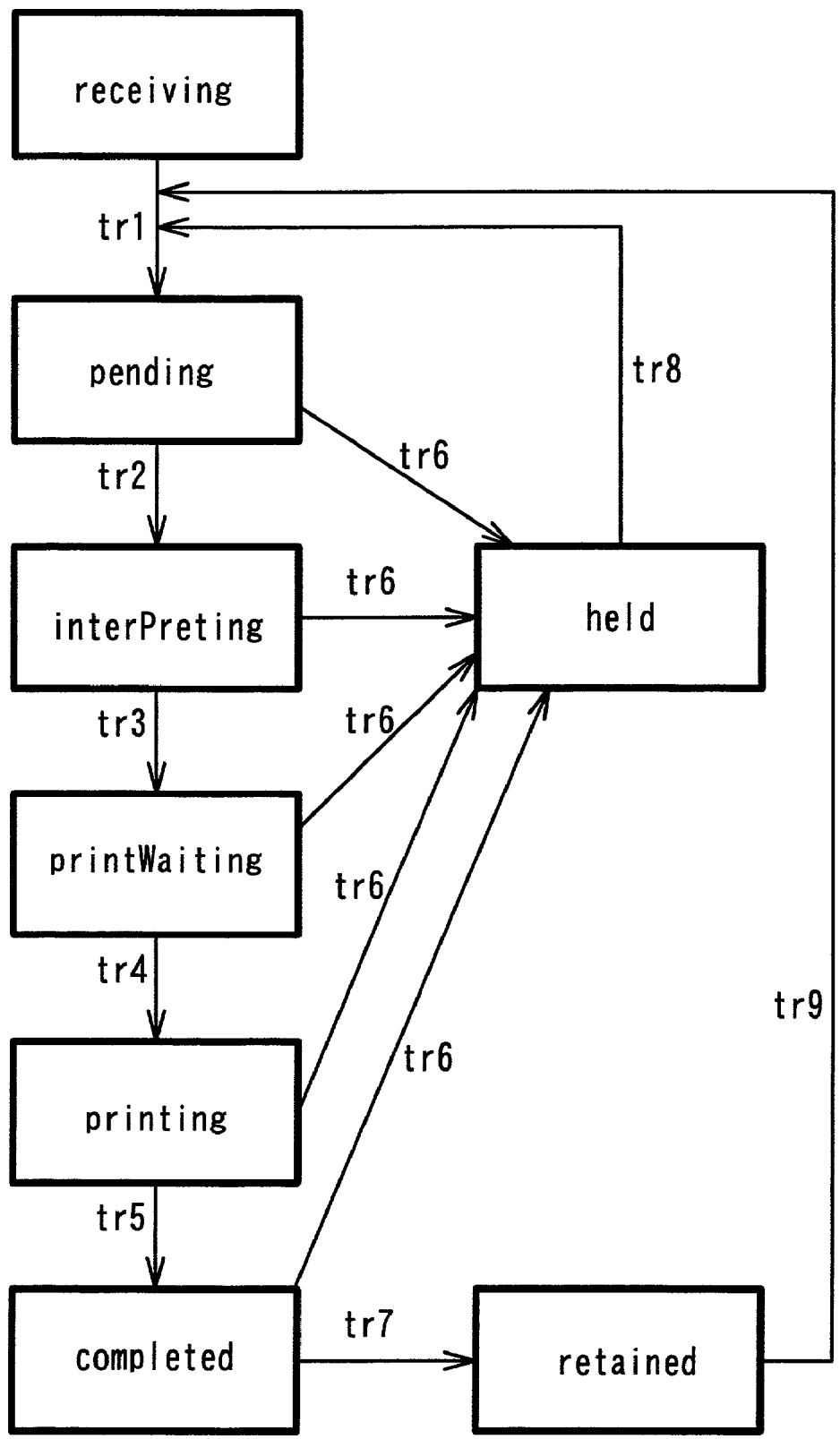
FIG. 1 shows the outline of the statuses defined by International Standard ISO/IEC10175-1.

Storage of the document in the 'held' status gives other advantages. As shown in FIG. 1, the status of the print job may be shifted to 'held' prior to completion of the printing operation. This arrangement effectively avoids non-required printing in the process of storing a frequently used document in the spool buffer. The print job in the 'held' status is not automatically eliminated with elapse of time. This attains the secure storage of the print job. In other words, this arrangement effectively prevents the required print job from being mistakenly eliminated from the buffer, which interferes with smooth reprinting.

C. Modified Example

The procedure of the above embodiment carries out the 'create' process to newly create a daughter job from a mother print job and sets the status of the daughter job to 'held' and the status of the mother job to 'pending'. The procedure of one possible modification may alternatively shift the status of the daughter job to 'pending' and the status of the mother job to 'held'. The latter case is discussed below as a modified example.

The job management apparatus of the modified example has the same functional block construction as that of the first embodiment (see FIG. 2). The difference between the modified example and the first embodiment is the functions of the create control module 6 as well as a printing process routine starting in the 'held' status.

Figure 5:
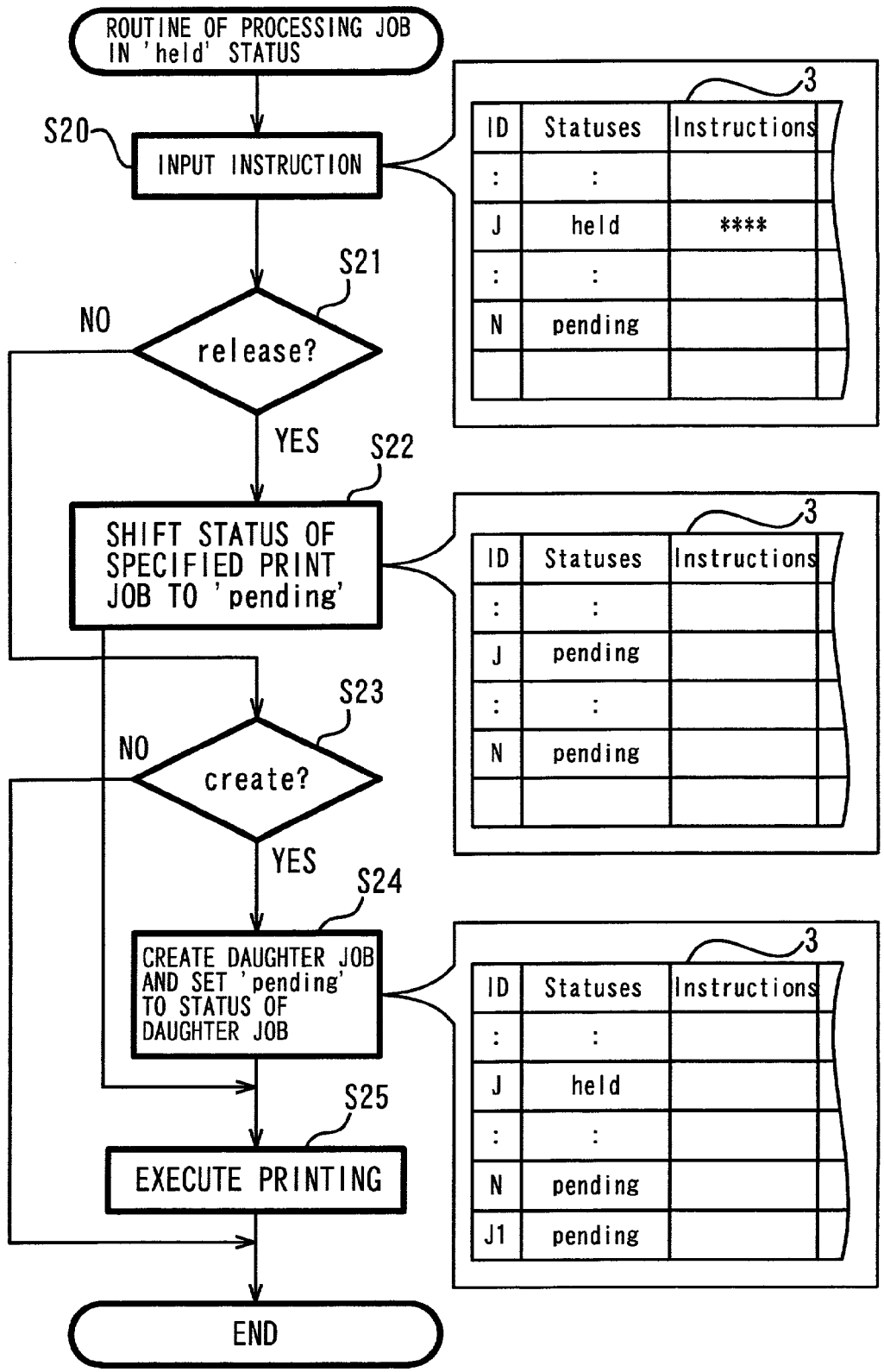
FIG. 5 is a flowchart showing a printing process routine executed in a modified example.

FIG. 5 is a flowchart showing the printing process routine executed in the modified example. The program starts the processing in response to input of an instruction to a print job in the 'held' status at step S20. When it is determined at step S21 that the input instruction is 'release', the held control module 4 carries out the same process as that of the embodiment. The held control module 4 namely shifts the status of the specified print job to 'pending' at step S22.

When the input instruction is not 'release', the program subsequently determines whether or not the input instruction is 'create' at step S23. When the input instruction is not 'create', this means that no printing instruction is given to the print job in the 'held' status. The program accordingly exits from the processing routine.

When the input instruction is 'create', on the other hand, the create control module 6 carries out a 'create' process in the modified example. The create control module 6 newly creates a daughter job from the print job in the 'held' status as a mother job and sets the status of the newly created daughter job to 'pending' at step S24. As illustrated in FIG. 5, a daughter job with an index J1 is created from the print job with the index J as the mother job and is stored in the status management table 3. The status of the daughter job with the index J1 is 'pending', while the mother job with the index J is kept in the 'held' status.

After the status of either the specified print job or its daughter job is updated to 'pending' by either the held control module 4 or the create control module 6, the print execution module 5 executes printing of the job in the 'pending' status at step S25. The print execution module 5 executes the specified print job with the index J in response to input of the 'release' instruction, while executing it daughter print job with the index J1 in response to input of the 'create' instruction.

The job management apparatus of the modified example exerts the similar effects to those of the first embodiment discussed above.

D. Second Embodiment

The first embodiment regards the process of creating a daughter job prior to execution of the actual printing operation in response to input of the 'create' instruction. A second embodiment regards the process of creating a daughter job on completion of the printing operation.

The job management apparatus of the second embodiment has the same functional block construction as that of the first embodiment (see FIG. 2). The difference between the second embodiment and the first embodiment is the functions of the create control module 6 as well as a printing process routine starting in the 'held' status.

Figure 6:
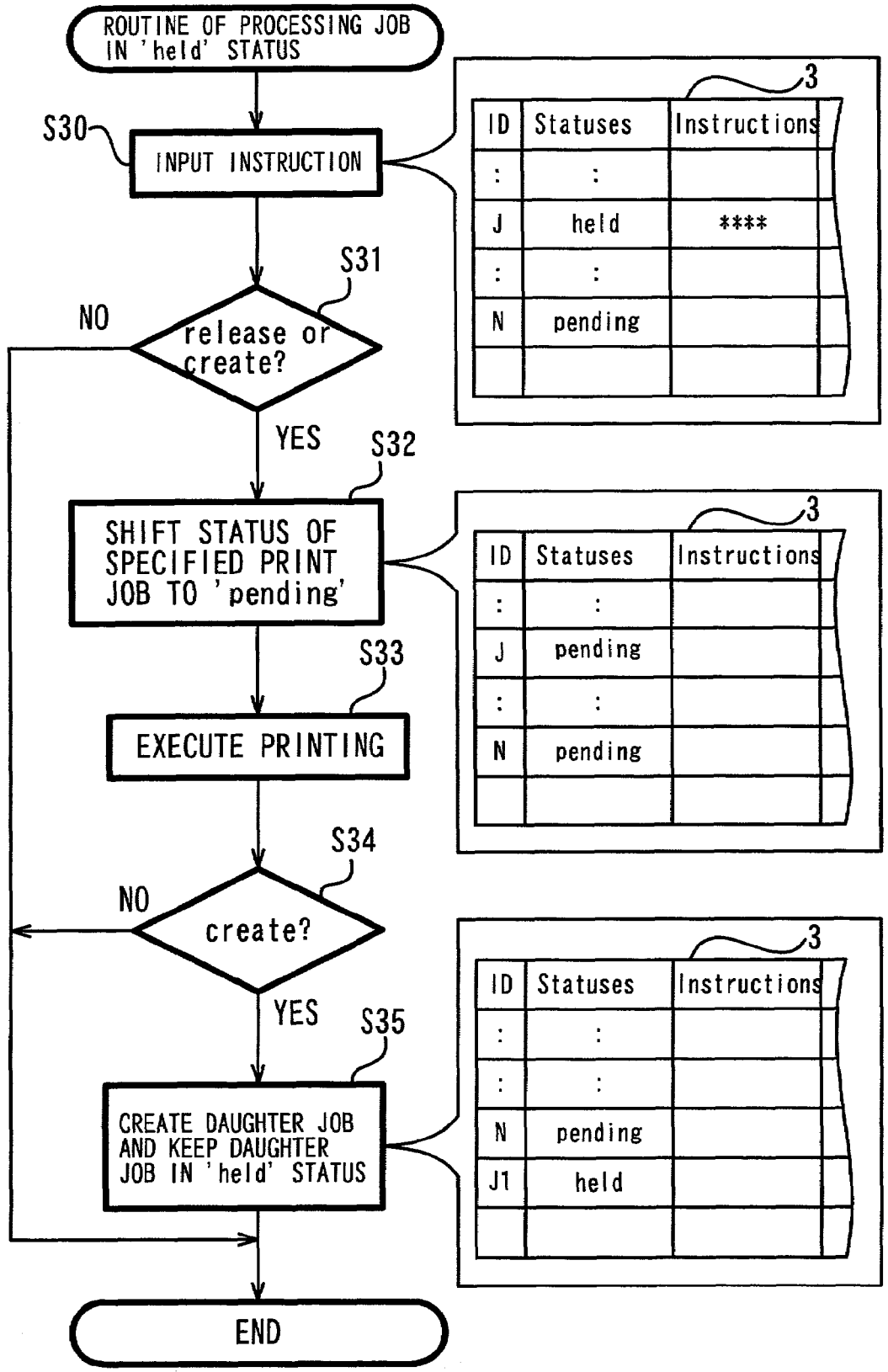
FIG. 6 is a flowchart showing a printing process routine executed in a second embodiment of the present invention.

FIG. 6 is a flowchart showing the printing process routine executed in the second embodiment. The program starts the processing in response to input of an instruction to a print job in the 'held' status at step S30. When it is determined at step S31 that the input instruction is neither 'release' nor 'create', this means that no printing instruction is given to the print job in the 'held' status. The program thus exits from the processing routine.

When the input instruction is either 'release' or 'create', the status of the specified print job is shifted to 'pending' at step S32. The held control module 4 carries out the shift of the status in the case of input of the 'release instruction, whereas the create control module 6 carries out the shift of the status in the case of input of the 'create' instruction. The print execution module 5 executes the print job whose status has been shifted to 'pending' at step S33.

The processing flow after completion of the printing operation depends upon whether or not the instruction given to the print job is 'create' at step S34. When the input instruction is not 'create' but 'release', the program exits from the processing routine. When the input instruction is 'create', on the other hand, the program newly creates a daughter job from the concluded print job as the mother job at step S35. The daughter job is kept in the 'held' status. As illustrated in FIG. 6, a daughter print job with an index J1 is newly created on completion of the print job with the index J and is stored in the status management table 3. The status of the daughter print job with the index J1 is 'held'. The print job with the index J may be eliminated or shifted to the 'retained' status after completion of the printing operation.

For simplicity of the processing of steps S34 and S35, a desirable procedure shifts the status of the print job to 'pending' in response to input of the 'create' instruction' while keeping the input instruction. In this case, the create control module 6 retrieves the status management table 3 to find a print job having the instruction information 'create'. When the retrieved print job is in the 'held' status, the status of the print job is shifted to 'pending'. When the retrieved print job is in the 'completed' status, on the other hand, a daughter job is created from the print job. This simplifies the processing of steps S34 and S35.

The job management apparatus of the second embodiment exerts the similar effects to those of the first embodiment discussed previously.

The above embodiments are to be considered in all aspects as illustrative and not restrictive. There may be many modifications, changes, and alterations without departing from the scope or spirit of the main characteristics of the present invention. All changes within the meaning and range of equivalency of the claims are therefore intended to be embraced therein. Some examples of possible modification are given below.

The first and the second embodiments regards the job management apparatus constructed in the printer PRT. The job management apparatus may otherwise be constructed in a special print server connecting with the LAN or in any of the client computers. The functions of the job management apparatus may be attained by multiple servers in a distributive manner.

The first and the second embodiments regard the job management apparatus in conformity with the International Standard. The technique of the present invention is applicable to a job management apparatus that does not conform to the International Standard as long as the job management apparatus has a status corresponding to the 'held' status discussed in the embodiments.

The diverse control processes discussed above may be actualized by the hardware structure, instead of the software configuration.

The scope and spirit of the present invention are indicated by the appended claims, rather than by the foregoing description.

What is claimed is:

1. A job management apparatus that manages statuses of print jobs in conformity with International Standard ISO/IEC10175-1, said job management apparatus comprising:

an instruction input module that inputs a printing instruction given to a print job in a 'held' status, the print job in the 'held' status being referred to as a mother job;

a print execution module that executes printing of the mother job in response to the printing instruction; and a job creation module that copies the executed mother job to create at least one daughter job on completion of the printing of the mother job and keeps the created at least one daughter job in 'held' status.

2. A job management apparatus that manages statuses of print jobs to be executed by a printing apparatus, said job management apparatus comprising:

an instruction input module that inputs a printing instruction given to a print job, which is excluded from a waiting queue of printing operation, is kept in a held status, and is referred to as a mother job, among various input print jobs;

a print execution module that executes the printing of the mother job in response to the printing instruction; and a job creation module that copies the executed mother job to create at least one daughter job on completion of the printing of the mother job and keeps the created at least one daughter job in the held status.

3. A job management method that manages statuses of print jobs to be executed by a printing apparatus, said job management method comprising the steps of:

(a) inputting a printing instruction given to a print job, which is excluded from a waiting queue of printing operation, is kept in a held status, and is referred to as a mother job, among various input print jobs;

(b) executing the printing of the mother job in response to the printing instruction; and (c) copying the executed mother job to create at least one daughter job on completion of the printing of the mother job and keeping the created at least one daughter job in the held status.

4. A recording medium in which a program for managing statuses of print jobs to be executed by a printing apparatus is recorded in a computer readable manner, said program causing a computer to attain the functions of:

in response to a printing instruction given to a print job, which is excluded from a waiting queue of printing operation, is kept in a held status, and is referred to as a mother job, executing the printing of the mother job; and copying the executed mother job to create at least one daughter job from the executed mother job on completion of the printing of the mother job and keeping the created at least one daughter job in the held status.

* * * * *